US 6,620,047 B1

(12) United States Patent
Alcorn et al.

(10) Patent No.: US 6,620,047 B1
(45) Date of Patent: *Sep. 16, 2003

(54) ELECTRONIC GAMING APPARATUS HAVING AUTHENTICATION DATA SETS (75) Inventors: Allan E. Alcorn, Portola Valley, CA (US); Harry H. Jenkins, Knoxville, TN (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/677,129

(22) Filed: Sep. 29, 2000

Related U.S. Application Data (63) Continuation of application No. 08/864,700, filed on May 28, 1997, now abandoned, and a continuation of application No. 09/107,031, filed on Jun. 29, 1998, now Pat. No. 6,149,522, which is a continuation-in-part of application No. 08/981,882, filed on Jun. 17, 1996, now Pat. No. 6,106,396, which is a continuation-in-part of application No. 08/497,662, filed on Jun. 29, 1995, now Pat. No. 5,643,086, which is a continuation-in-part of application No. 08/672,775, filed on Jun. 28, 1996, now Pat. No. 6,287,202.

(51) Int. Cl.[7] .................................................. A63F 9/24
(52) U.S. Cl. .......................................... 463/37; 463/20
(58) Field of Search ............................ 463/1, 9, 11–13, 463/16, 20, 25, 29–30, 36–37, 40, 42, 43, 46; 273/138.1, 138.2, 237, 143 R, 292; 345/173

(56) References Cited

U.S. PATENT DOCUMENTS

| 3,825,905 A | 7/1974 | Allen, Jr. ................ 340/172.5 |
| 3,838,264 A | 9/1974 | Maker ........................ 235/153 |
| 4,200,770 A | 4/1980 | Hellman et al. .............. 178/22 |
| 4,218,582 A | 8/1980 | Hellman et al. .............. 178/22 |
| 4,354,251 A | 10/1982 | Hellwig et al. ............. 364/900 |
| 4,405,829 A | 9/1983 | Rivest et al. ................ 178/221 |
| 4,467,424 A | 8/1984 | Hedges et al. .............. 178/221 |
| 4,727,544 A | 2/1988 | Brunner et al. ............... 371/21 |
| 4,752,068 A | 6/1988 | Endo .......................... 273/1 E |
| 4,759,064 A | 7/1988 | Chaum ........................ 380/30 |
| 4,837,728 A | 6/1989 | Barrie et al. ................ 364/412 |
| 4,845,715 A | 7/1989 | Francisco .................... 371/53 |
| 4,848,744 A | 7/1989 | Steininger et al. .......... 273/1 E |
| 4,856,787 A | 8/1989 | Itkis ........................... 273/237 |
| 4,865,321 A | 9/1989 | Nakagawa et al. ........ 273/85 G |
| 4,911,449 A | 3/1990 | Dickinson et al. .......... 273/143 |
| 4,930,073 A | 5/1990 | Cina, Jr. ..................... 364/300 |
| 4,951,149 A | 8/1990 | Faroudja ..................... 358/230 |
| 5,004,232 A | 4/1991 | Wong et al. ................ 273/435 |
| 5,021,772 A | 6/1991 | King et al. .................. 340/724 |
| 5,235,642 A | 8/1993 | Wobber et al. ............... 380/25 |
| 5,259,613 A | 11/1993 | Marnell, II ............. 273/138 A |
| 5,283,734 A | 2/1994 | Von Kohorn ............... 364/412 |
| 5,288,978 A | 2/1994 | Iijima ......................... 235/380 |
| 5,291,585 A | 3/1994 | Sato et al. .................. 395/500 |

(List continued on next page.)

OTHER PUBLICATIONS

Casino Journal of Nevada, Oct. 1996, pp. 64–66, 68–76, 78, 82, 84, 86, 88, 90, 92, 94, 96, 98, 145, and 146.
Assignment of U.S Patent No. 5,643,086 to IGT.
Assignment of U.S. Patent No. 6,149,522 to IGT.
Assignment of U.S. Serial. No. 09/677,129 to IGT.

*Primary Examiner*—Mark Sager
(74) *Attorney, Agent, or Firm*—Marshall, Gerstein & Borun (57) ABSTRACT

Improved electronic gaming apparatus, including a cabinet for housing video and sound generating electronics, coin-handling and pay-out mechanism and a video display screen. The display screen is substantially taller than it is wide and preferably has a touch screen associated therewith. Although the displayed video presentation may take any form, the preferred slot machine display embodiment includes graphics replicating the standard play board at top, game board in middle, and principal user input interface below.

18 Claims, 4 Drawing Sheets

U.S. PATENT DOCUMENTS

| | | | |
|---|---|---|---|
| 5,326,104 A | 7/1994 | Pease et al. | 273/138 A |
| 5,342,047 A | 8/1994 | Heidel et al. | 273/85 |
| 5,343,527 A | 8/1994 | Moore | 380/4 |
| 5,465,364 A | 11/1995 | Lathrop et al. | 395/700 |
| 5,488,702 A | 1/1996 | Byers et al. | 395/186 |
| 5,489,095 A | 2/1996 | Goudard et al. | 273/138 A |
| 5,586,766 A | 12/1996 | Forte et al. | 273/309 |
| 5,604,801 A | 2/1997 | Dolan et al. | 380/21 |
| 5,643,086 A | 7/1997 | Alcorn et al. | 463/29 |
| 5,644,704 A | 7/1997 | Pease et al. | 395/183.18 |
| 5,655,965 A | 8/1997 | Takemoto et al. | 463/20 |
| 5,704,835 A | 1/1998 | Dietz, II | 463/20 |
| 5,725,428 A | 3/1998 | Achmüller | 463/20 |
| 5,737,418 A | 4/1998 | Saffari et al. | 380/9 |
| 5,800,264 A | 9/1998 | Pascal et al. | 463/16 |
| 5,934,672 A | 8/1999 | Sines et al. | 273/143 R |
| 6,104,815 A | 8/2000 | Alcorn et al. | 380/251 |
| 6,106,396 A | 8/2000 | Alcorn et al. | 463/29 |
| 6,149,522 A | 11/2000 | Alcorn et al. | 463/29 |

Fig. 1

Fig_2

| Manager | Description |
|---|---|
| Data Streamer | Enables an application to use data within a large file without loading the entire file's contents into memory. |
| Display Manager | Enables an application to control screen drawing to the video display. |
| Cash Manager | Provides the application with a secure interface for monetary transactions. |
| Hotspot Manager | Provides the application interface to the touchscreen. |
| Button Manager | Provides the application interface to the hard buttons on the slot machine bezel. |

*Fig_5*

*Fig_6*

ELECTRONIC GAMING APPARATUS HAVING AUTHENTICATION DATA SETS

This is a continuation of U.S. Ser. No. 08/864,700 filed in the Patent Office on May 28, 1997 and entitled "Improved Electronic Gaming Apparatus", now abandoned, and a continuation-in-part of U.S. Ser. No. 09/107,031 filed in the Patent Office on Jun. 29, 1998 and entitled "Method of Authennticating Game Data Sets in an Electronic Casino Gaming System", now U.S. Patent No. 6,149,522, which is a continuation-in-part of U.S. Ser. No. 08/981,882 filed on Jun. 17, 1996 (as International Application No. PCT/US96/10463) and entitled "Entitled Casino Gaming System With Improved Play Capacity, Authentication and Security", now U.S. Patent No. 6,106,396, which is a continuation-in-part of U.S. Ser. No. 08/497,662 filed in the Patent Office on Jun. 29, 1995 and entitled "Electronic Casino Gaming Apparatus With Improved Play Capacity, Authentication and Security", now U.S. Patent No. 5,643,086.

BACKGROUND OF THE INVENTION

1. Field of the Invention

The present invention relates generally to electronic gaming apparatus, and more particularly to an improved gaming machine for improving the play and display of gaming graphics utilizing a vertically oriented video screen having touch screen input as a player interface to the device.

2. Brief Description of the Prior Art

Electronic gaming devices have long been provided for playing games such as roulette, poker, bingo, keno, lotto and various other games, and have historically been constructed in a slot machine format typically including a pay board wherein the winning pay-out combinations are displayed; a play section in which electronic or mechanical reels, card-playing indica or other gaming objects are displayed; and a third area in which a player interface is provided by means of an assortment of buttons, switches, etc. More modern gaming machines have included a video display screen (CRT tube) that is driven by an image generator coupled to a microprocessor that serves as the game controller. In such video implementations, standard television-style cathode ray tubes have normally been used, and electronically generated reels, cards and other objects have been depicted thereon for implementing play of the game. In some embodiments, the pay board is also included as part of the video display, but because this limits the active display area available for gaming presentation, a different screen or type of screen separate and apart from the video display is often utilized. Touch screen interfaces have also been used in gaming machines, but are often limited in their application because of the limited space available on the video screen. Another limitation of the prior art devices using video display screens is that the display has been quite sterile in its presentation, often comprising nothing more than an attempt to electronically present a two-dimensional image replicating the functional display elements of the prior art mechanical gaming apparatus.

There is thus a need for an improved gaming station or machine that uses modern video graphics and sound technology to provide a complete user interface that in at least one aspect conveniently integrates pay board, play screen, and player input interface in a single uniquely designed and oriented video screen format.

SUMMARY OF THE INVENTION

In one aspect, the invention is directed to a gaming machine comprising: a cabinet; at least one user-interface button; a value receiving mechanism associated with the cabinet; a value-dispensing mechanism assoicated with the cabinet; a video display unit associated with the cabinet; a touch-sensitive device associated with the video display unit; a processor disposed in the cabinet and operatively coupled to the user-interface button, the value-receiving mechanism, the video display unit and the touch-sensitive device; a read only memory disposed in the cabinet; basic input/output system (BIOS) software stored in the read-only memory; a critical data storage software that causes critical system data to be stored in the nonvolatile memory; disk memory disposed in the cabinet and operatively coupled to the processor; system software stored in the disk memory, the system software comprising software representing a game that may be played by a player; encoded data stored in the disk memory, the encoded data having been generated from at least one message digest that was generated based on using an encoding function with the system software; secure loading software stored in memory that loads system software from the disk memory into random-access memory and verifies correctness and authenticity of the system software, the secure loading software verifying correctness and authenticity of the system software based on a comparison of data generated from the encoded data and data generated from the system software; and operating system (OS) software stored in memory, the operating system software comprising an application programming interface including a first application programming interface portion that provides a software interface to the video display unit and a second application programming interface portion that provides a software interface to the touch-sensitive device.

This and other aspects of the invention will be apparent in view of the following description of various embodiments of the invention, which is made in connection with the figures of the drawing briefly described below.

DETAILED DESCRIPTION OF THE PREFERRED EMBODIMENTS

Figure 1:
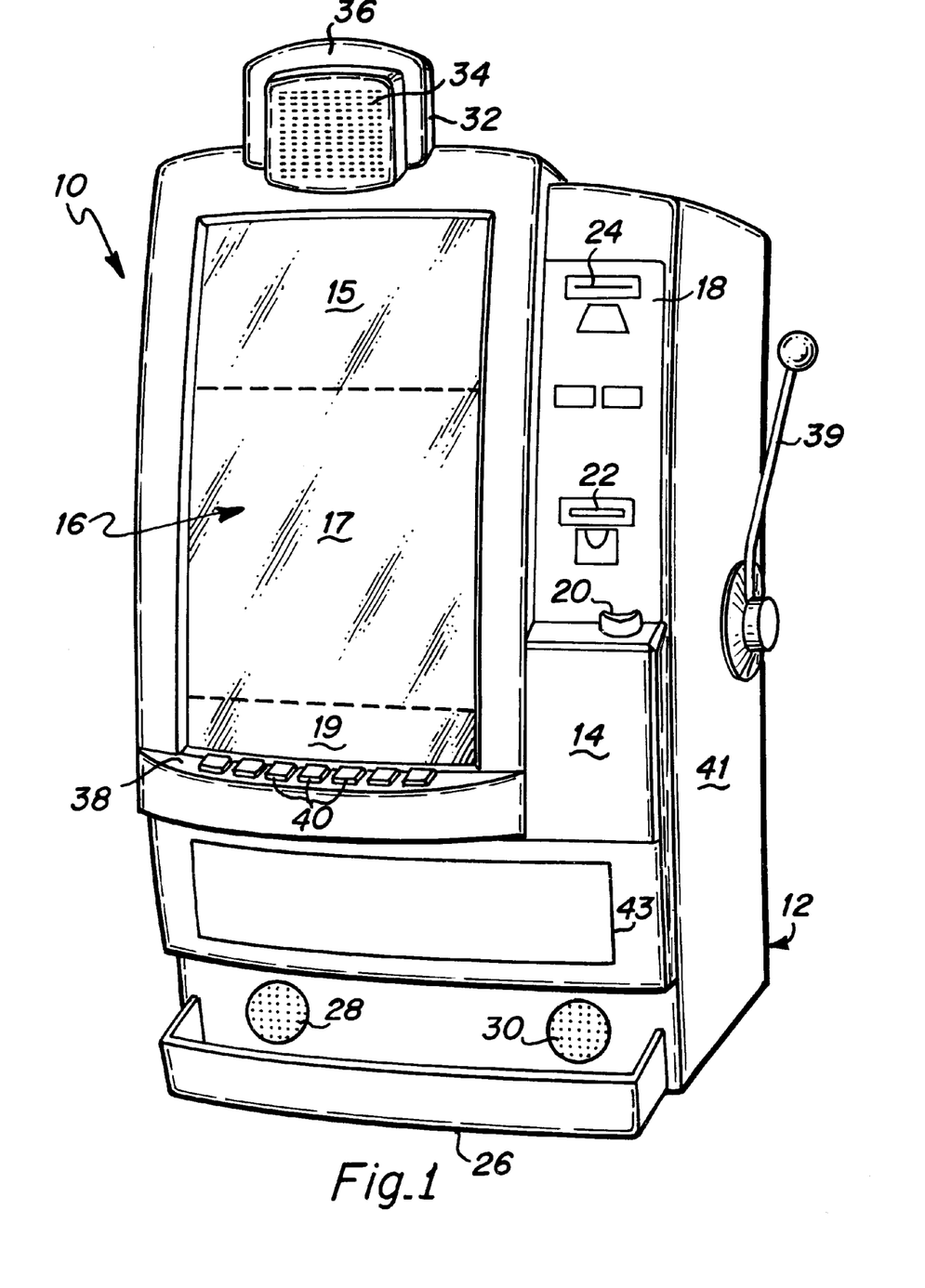
FIG. 1 is a perspective view illustrating a gaming machine in accordance with the present invention.

A preferred embodiment of the present invention is depicted at 10 in FIG. 1 and includes a more or less rectangularly configured cabinet 12 forming an enclosure for the various functional mechanical, electrical and electronic components. The front face 14 of cabinet 12 is uniquely configured to include as the principal component thereof a video display screen 16 disposed in portrait format with its vertical dimension being substantially larger than its horizontal dimension. As is apparent from the illustration, the screen 16 occupies a substantial part of the front face of the device 10. Positioned to the right of screen 16 is a currency input section 18 including a coin-receiving slot 20, a paper money-receiving slot 22, and a credit/debit card slot 24. A pair of buttons 23 and 25 may be provided for allowing the player to select a "cash" or "credit" mode for payout of winnings.

Disposed beneath screen 16 and at the bottom of the front face is a coin drop receptacle 26. Immediately above the coin drop receptacle are a pair of high-quality audio speakers 28 and 30. Above screen 16 is an annunciator 32 including a third high-quality audio speaker or signal generator 34 and a multi-colored, multi-light display apparatus 36. Disposed immediately beneath screen 16 on a slightly protruding shelf 38 are a plurality of user interface buttons 40 that are of conventional configuration. Formed integral with the front face of display screen 16 is a transparent touch screen that is dynamically configurable to allow manual user inputs at screen positions determined by the software associated with the particular game or attract mode being presented.

On the right side of cabinet 12 is a conventional pull handle 39 that may be optionally used as a part of the user interface to the gaming apparatus.

The cabinet 12 was designed to coincide with the overall dimensions of traditional slot machines so that the device can be placed in existing casino carousels without requiring reconfiguration of the stands or machine layouts. The right side of the cabinet forms a compartment for containing currency input devices such as coin and bill acceptors, a card reader, keypad, and perhaps a display for a player tracking network interface. A locked service door 41 forms the right side wall of the cabinet and allows access to the currency components in this section. The front 43 of the lower section of the enclosure contains a coin hopper (a cache of coins that is used to pay out the player's winnings when playing in cash mode). The back of the lower section of the cabinet (behind the hopper) contains a CPU box with all of the associated electronics and power supplies. A locked service door allows access to the hopper in this section.

Player tracking network electronics are located in the top of the system and are accessed by removing a top cover (not shown).

The cabinet layout, which is more or less traditional for video-type slot machines, leaves a tall and narrow section at the upper left for the CRT that forms the display screen 16. To maximize the screen area in the available space, a 26", wide screen CRT display device rotated 90° into a "portrait mode" is used with the screen origin at the bottom left corner, and the image scanned from left to right. For purposes of this disclosure "portrait mode" is defined as a display configuration in which a display screen has a height dimension that is substantially larger than its width dimension. The wide screen CRT has a 16×9 (height to width) aspect ratio and a 0.69 mm dot pitch allowing for an 856×480 visible display area. Portrait mode configured display screens or CRTs having other aspect ratios may also be used. For example, although less desirable, a standard 4×3 CRT monitor rotated into a portrait mode could be used.

Figure 2:
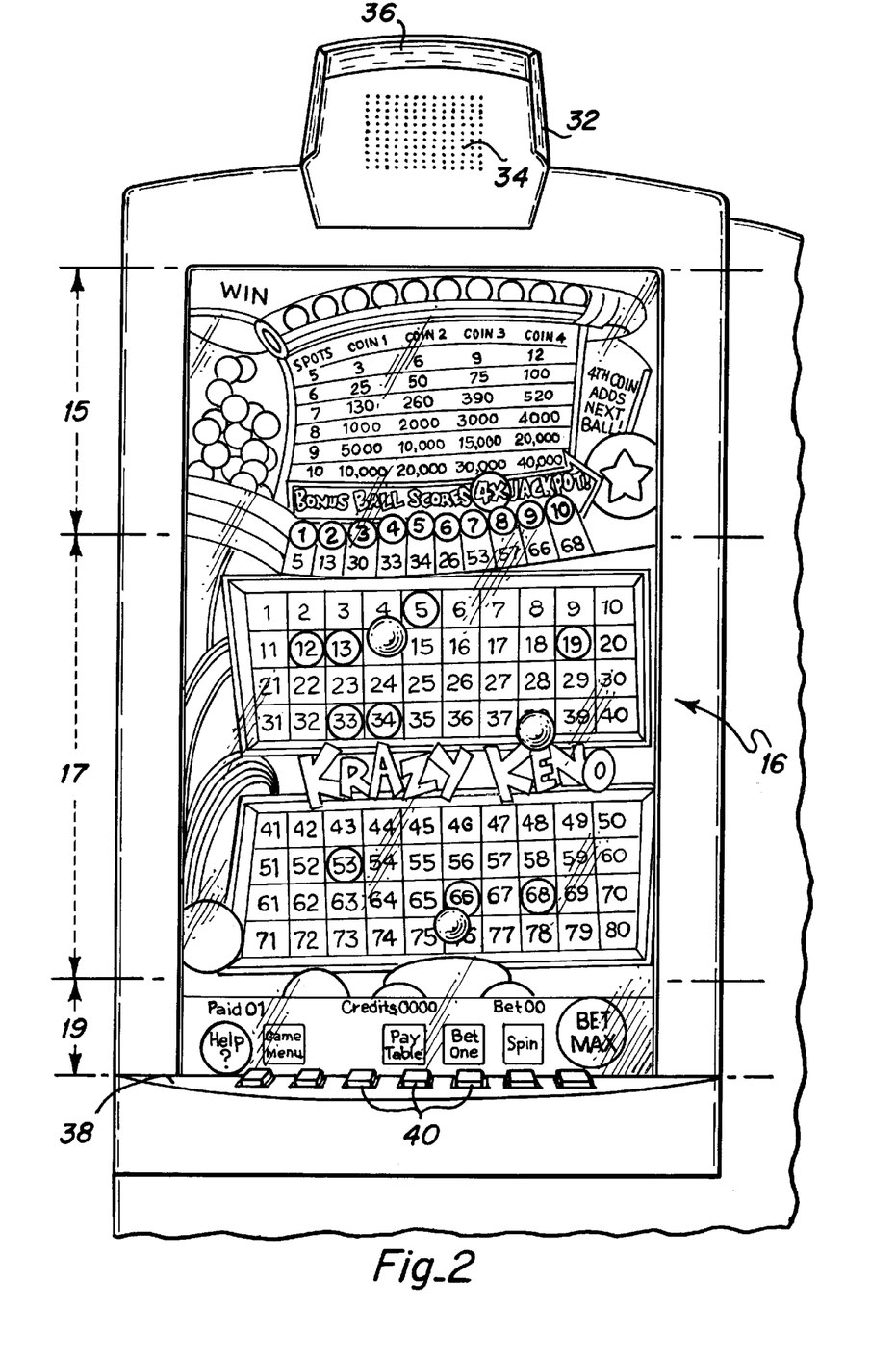
FIG. 2 depicts a typical screen display in accordance with the present invention.

In accordance with one aspect of the present invention, when operating in a game play mode, the display screen may be electronically subdivided into three arbitrarily sized regions: an upper region 15 in which a pay board will be displayed, setting forth the jackpot payouts as a function of the coins input; a mid region 17 in which a game board, play reels, card hands, or other game play indicia is displayed; and a lower region 19 in which touch screen "buttons" are displayed for facilitating player selection of various input functions such as "hold," "bet 1," "draw," etc. One example of a "3-way" screen configuration is illustrated in FIG. 2. Depending on the particular game being played, the dimensions of these regions may change. Furthermore, the configuration of the touch screen responsive areas within each region may likewise change to correspond to associated graphics displayed in one ore more of the regions. Moreover, in "attract mode" the screen may be subdivided into a geometrically grid of regions, e.g., a 2×4 or 2×6 (etc.) grid in which passive or active game logos may be simultaneously displayed for selection by a player. In such mode the touch screen would typically be configured to call up the game corresponding to the logo touched by the player.

An integrated touch screen overlaying the display screen, along with the series of "hard" buttons 40 arrayed along the bottom edge of the display, provide the main player interface to the system.

Figure 3:
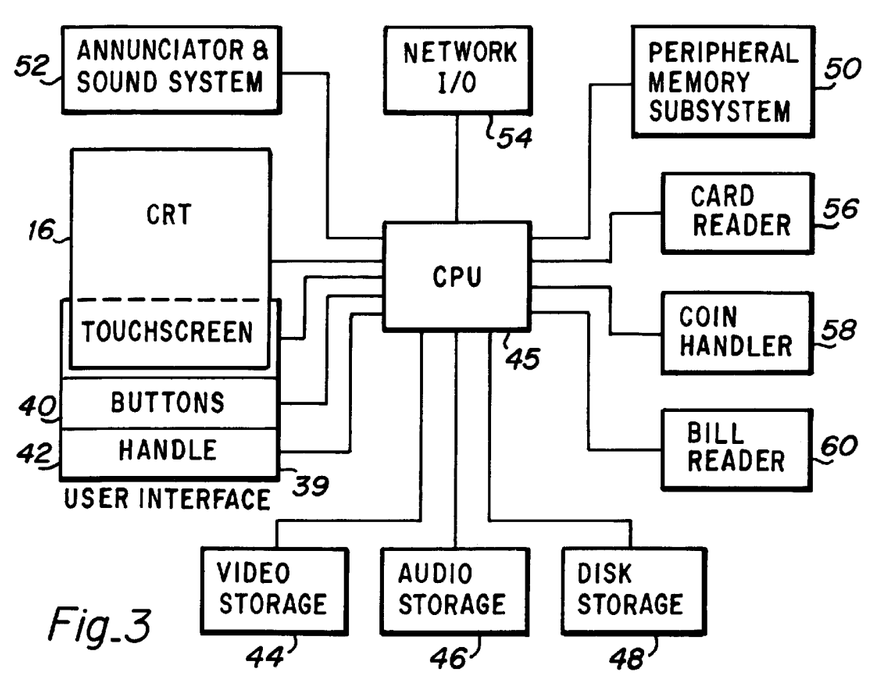
FIG. 3 is a functional block diagram illustrating the principal functional components used in the gaming machine of the present invention.

In FIG. 3 of the drawing, a generalized block diagram depicts the principal functional components of the system and includes a central processing unit (CPU) 45, the CRT 16, a user interface 42 that includes the touch screen buttons 40 and pull handle 39, a video storage subsystem 44, an audio storage subsystem 46, a disk storage subsystem 48, a peripheral memory subsystem 50, an annunciator and sound system 52, a network I/O 54, a card reader 56, a coin handler 58, and a bill reader 60. In the preferred embodiment, CPU 45 is a 133 MHz Pentium processor using a combination of the DUCK video Codec for motion video, A-RL (Alpha Run-Length) decoding of static graphics, and software compositing for the individual elements.

Although not shown in detail herein, the system includes a motherboard, a PCI-based video board and SCSI controller, a peripheral memory board, a general purpose input/output (GPIO) board, a power transformer, a disk drive, and a CPU power supply. The peripheral memory board is installed on the mother board PCI bus and is used to replace the BIOS ROMs of the standard PC architecture. Whereas on the standard mother boards the PCI-to-ISA bridge (PIB) chip provides the interface to the system BIOS ROMs by subtractive decoding of PCI accesses in the normal PCI BIOS range and its high-memory aliases, the peripheral memory board in the preferred embodiment responds to accesses to the BIOS address range using positive decoding, responding to the requested cycles before the PIB chip responds. This allows the ROM-based BIOS and OS to reside at these locations without modifying the mother board.

In addition, the peripheral memory board provides a removable subsystem containing all of the machine states, thereby allowing secure system auditing. The peripheral memory board contains 1 MB of EPROM to hold the BIOS and OS (including the secure loader described below), 64 KB of nonvolatile RAM to implement a SafeStore system, and 128 KB of electrically erasable PROM (EEPROM) to store the system configuration.

A peripheral memory controller performs byte-assembly and disassembly on memory reads/writes and parity generation on the PCI reads.

The preferred embodiment exhibits total immunity to Electric-Static Discharge (ESD) to a level of 27 KV. The requirement for this level of ESD immunity is an artifact of low humidity and prevalence of synthetic materials (carpeting, etc.) in Nevada casinos. All standard mother boards support an IEEE 1284 compatible parallel port, and such port provides the interface to the GPIO board. The GPIO board provides an electrically isolated interface to the external device ports and maps them to registers accessible through the mother board parallel port.

Figure 4:
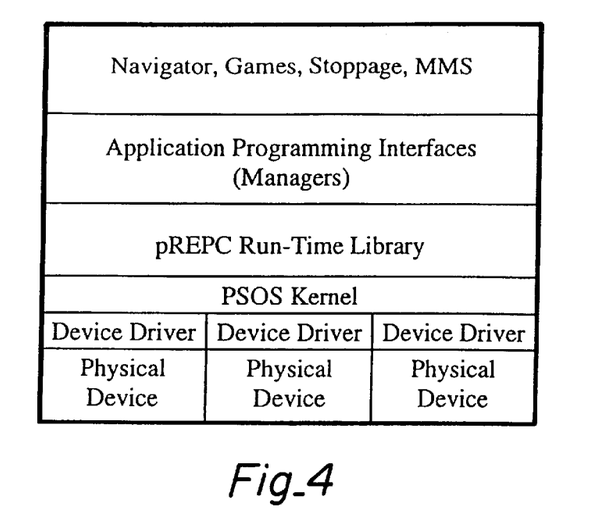
FIGS. 4, 5 and 6 are diagrams generally illustrating software architecture and features of the preferred embodiment.

The system software is designed to address the unique requirements of casino gaming machines, including high reliability and security, fault detection and recovery, and responsive performance. The system software architecture is illustrated in FIG. 4.

Figure 5:
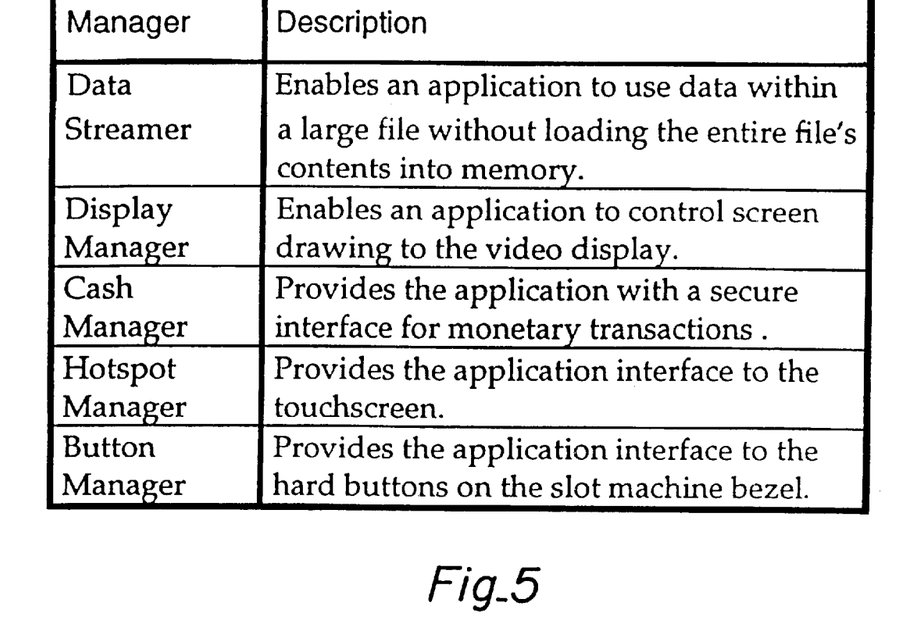

A pSOS real-time operating system serves as the basis for the software platform of the preferred embodiment. This pSOS system consists of a multi-tasking kernel, the pREPC, ANSI-C, run-time library function, and a driver support library to access physical devices through a set of device drivers. The run-time Application Programming Interface (API) is a layer of system software providing a set of standard functions that application programmers develop to. Because the API provides a layer of abstraction between the applications and the hardware, the applications are not affected if the hardware or lower level system software are modified. The API is divided into a series of managers, each of which provides either access to some physical device or provides some set of services for the programmer. Examples of these managers are shown in the table illustrated in FIG. 5.

The system applications include a Navigator, Play Stoppage, a suite of games, and the Machine Management System. The Navigator presents the player with an animated icon of each game. The animation describes the key features of the game; users enter a game by touching its icon. Each game is a custom application offering a specific set of propositions to the player. Each game is accompanied by on-line help that describes the rules of play, general disclaimers for the game, and so on. Play Stoppage is an application that runs short animations or video segments that entertain the player if a system fault occurs, while communicating information about why a game was interrupted and when it will be returned to play. The Machine Management System (MMS) provides a graphical interface to all technical support functions of the slot machine. This includes player conflict resolution, accounting, product configuration, and machine diagnostics.

As described in detail in the above-referenced U.S. patent application Ser. No. 08/497,662, before software can be loaded from the hard disk, it must be verified as being an authentic proprietary product. A secure loader is the system software component that loads executable files from the disk subsystem into RAM, verifies that the contents are correct, and then executes the image. The secure loader is based on the use of two-key cryptographic authentication from RSA Data Security, Inc. of Redwood City, Calif.

When a software release is ready for shipment, a HASH function designed for cryptographic use generates a unique fixed-length string of 128 bits for the loadable code image. This string, called a message digest, is then encrypted using RSA software and the proprietor's private key to produce a digital signature for the image. The signature is then written to disk with the loadable code image. When the code image is loaded from the disk and is ready to be executed during the system boot sequence, the secure loader decrypts the digital signature using the public key stored in ROM. The secure loader verifies that the image is authentic by comparing the message digest computed for the loadable code image with the message digest decrypted from disk. The software can be authenticated at any time since the console diagnostics include tools that allow the operator to query all loadable applications and run the RSA verification algorithm on them on demand. The authentication process is not limited to just software images. Graphics files or any binary data set can be authenticated. Because the graphics images are so large, they are not verified every time a game is loaded. If needed, critical graphic images such as the faces of cards can be verified before initial use in a game.

A SafeStore application provides fault-tolerant storage for critical system data called safe objects stored in system nonvolatile SRAM. To facilitate recovery of information after a crash or system failure, state information about each safe object along with the object data is saved in an internal format known as a binary large object (BLOB). To protect against hardware or software faults corrupting SafeStore, all safe objects are mirrored across two independent nonvolatile SRAMs. If corruption occurs by hard or soft failures to indicate locations in SRAM, or if complete SRAM failures occur, SafeStore will detect this corruption and recover the data.

Figure 6:
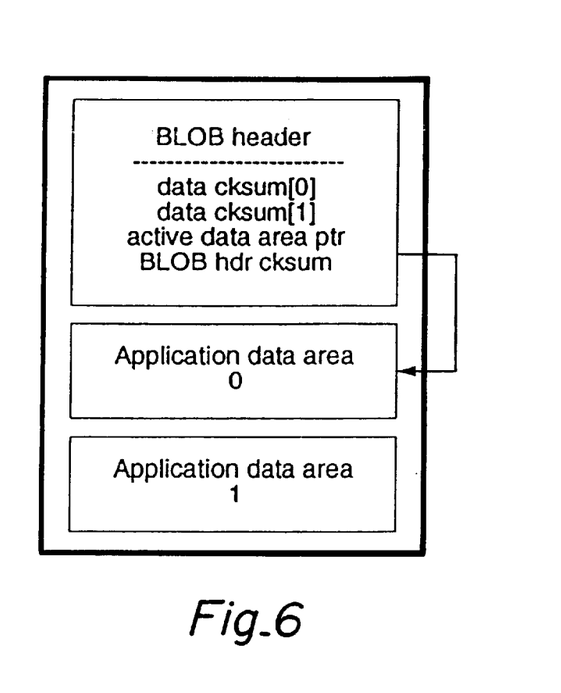

FIG. 6 depicts a BLOB in SafeStore with all of the important BLOB header fields. The data check sum fields 0 and 1 contain the check sums of the data in data areas 0 and 1, respectively. The active data area pointer field indicates that data area 0 contains the latest data written to SafeStore. The BLOB header check sum field contains a check sum of the BLOB header, including the data area check sums and the data area pointer. During a SafeStore update, the BLOB header is read into main memory where the header check sum is computed and checked against the value of the header check sum field. If the check sum does not match, the system will tilt. Assuming it matches, the new data is copied into the inactive data area. The copy of the BLOB header in main memory is updated with the check sum of the new data; the active data area pointer is updated to point to the data area 1; and the new header check sum is computed and written to SafeStore.

Although the present invention has been described above in terms of specific embodiments, it is anticipated that alterations and modifications thereof will no doubt become apparent to those skilled in the art. For example, it is contemplated that video screens formed by other apparatus such as liquid crystal displays, field emission displays, interference element displays, projection TV, and perhaps holographic and other display technology may be used in place of the CRT device presently used in the preferred embodiment. Furthermore, other cabinet configurations and designs may be used to support a large portrait-mode display screen, and whereas the preferred embodiment utilizes a single means to form the display screen, it is contemplated that a similar result may be achieved by using a plurality of contiguous display devices synchronously driven to display different portions of a common image. It is therefore intended that the following claims be interpreted as covering all such alterations and modifications as fall within the true spirit and scope of the invention.

What is claimed is:

1. A gaming machine, comprising:
   a cabinet;
   at least one user-interface button;
   a value-receiving mechanism associated with said cabinet;
   a value-dispensing mechanism associated with said cabinet;
   a video display unit associated with said cabinet;
   a touch-sensitive device associated with said video display unit;
   a processor disposed in said cabinet and operatively coupled to said user interface button, said value-receiving mechanism, said video display unit and said touch-sensitive device;
   a read-only memory disposed in said cabinet;
   basic input/output system (BIOS) software stored in said read-only memory;
   a nonvolatile memory capable of storing critical system data;

critical data storage software that causes critical system data to be stored in said nonvolatile memory;

disk memory disposed in said cabinet and operatively coupled to said processor;

system software stored in said disk memory, said system software comprising:
- a first software portion representing a first game that may be played by a player;
- a second software portion representing a second game that may be played by a player; and
- a third software portion that causes a first icon representing said first game and a second icon representing said second game to be generated on said video display unit, said third software portion causing one of said first and second games to be initiated in response to a player touching one of said first and second icons;

encoded data stored in said disk memory, said encoded data having been generated from at least one message digest that was generated based on using an encoding function with said system software;

secure loading software stored in memory that loads system software from said disk memory into random-access memory and verifies correctness and authenticity of said system software, said secure loading software verifying correctness and authenticity of said system software based on a comparison of data generated from said encoded data and data generated from said system software; and operating system (OS) software stored in memory, said operating system software comprising an application programming interface including a first application programming interface portion that provides a software interface to said video display unit and a second application programming interface portion that provides a software interface to said touch-sensitive device.

2. A gaming machine as defined in claim 1 wherein said encoded data was generated from at least one message digest that was generated based on using a Hash function with said system software.

3. A gaming machine as defined in claim 1 wherein said encoded data comprises data that was generated by encrypting at least one message digest that was generated based on using a Hash function on said system software.

4. A gaming machine as defined in claim 1 wherein said secure loading software verifies correctness and authenticity of said system software based on a comparison of data generated by decoding said encoded data and at least one message digest generated from said system software.

5. A gaming machine as defined in claim 1,
wherein said encoded data was generated by encrypting at least one message digest that was generated from said system software, and
wherein said secure loading software verifies correctness and authenticity of said system software based on a comparison of data generated by decrypting said encoded data and at least one message digest generated from said system software.

6. A gaming machine as defined in claim 1 wherein said value-receiving mechanism comprises a coin-receiving slot.

7. A gaming machine as defined in claim 1 wherein said value-receiving mechanism comprises a paper money-receiving slot.

8. A gaming machine as defined in claim 1 wherein said value-receiving mechanism comprises a credit/debit card slot.

9. A gaming machine as defined in claim 1 wherein said value-dispensing mechanism comprises a coin hopper.

10. A gaming machine, comprising:

a cabinet;

at least one user-interface button;

a value-receiving mechanism associated with said cabinet;

a value-dispensing mechanism associated with said cabinet;

a video display unit associated with said cabinet;

a touch-sensitive device associated with said video display unit;

a processor disposed in said cabinet and operatively coupled to said user-interface button, said value-receiving mechanism, said video display unit and said touch-sensitive device;

a read-only memory disposed in said cabinet;

basic input/output system (BIOS) software stored in said read-only memory;

a nonvolatile memory capable of storing critical system data;

critical data storage software that causes critical system data to be stored in said nonvolatile memory;

disk memory disposed in said cabinet and operatively coupled to said processor;

system software stored in said disk memory, said system software comprising software representing a game that may be played by a player;

encoded data stored in said disk memory, said encoded data having been generated from at least one message digest that was generated based on using an encoding function with said system software;

secure loading software stored in memory that loads system software from said disk memory into random-access memory and verifies correctness and authenticity of said system software, said secure loading software verifying correctness and authenticity of said system software based on a comparison of data generated from said encoded data and data generated from said system software; and operating system (OS) software stored in memory, said operating system software comprising an application programming interface including a first application programming interface portion that provides a software interface to said video display unit and a second application programming interface portion that provides a software interface to said touch-sensitive device.

11. A gaming machine as defined in claim 10 wherein said encoded data was generated from at least one message digest that was generated based on using a Hash function with said system software.

12. A gaming machine as defined in claim 11 wherein said encoded data comprises data that was generated by encrypting at least one message digest that was generated based on using a Hash function on said system software.

13. A gaming machine as defined in claim 11 wherein said secure loading software verifies correctness and authenticity of said system software based on a comparison of data generated by decoding said encoded data and at least one message digest generated from said system software.

14. A gaming machine as defined in claim 11, wherein said encoded data was generated by encrypting at least one message digest that was generated from said system software, and wherein said secure loading software verifies correctness and authenticity of said system software based on a comparison of data generated by decrypting said encoded data and at least one message digest generated from said system software.

15. A gaming machine as defined in claim 11 wherein said value-receiving mechanism comprises a coin-receiving slot.

16. A gaming machine as defined in claim 11 wherein said value-receiving mechanism comprises a paper money-receiving slot.

17. A gaming machine as defined in claim 11 wherein said value-receiving mechanism comprises a credit/debit card slot.

18. A gaming machine as defined in claim 11 wherein said value-dispensing mechanism comprises a coin hopper.

* * * * *

(12) EX PARTE REEXAMINATION CERTIFICATE (6318th)
United States Patent
Alcorn et al.

(10) Number: US 6,620,047 C1
(45) Certificate Issued: *Jul. 22, 2008

(54) ELECTRONIC GAMING APPARATUS HAVING AUTHENTICATION DATA SETS

(75) Inventors: Allan E. Alcorn, Portola Valley, CA (US); Harry H. Jenkins, Knoxville, TN (US)

(73) Assignee: IGT, Reno, NV (US)

Reexamination Request:
No. 90/008,944, Dec. 4, 2007

Reexamination Certificate for:
Patent No.: 6,620,047
Issued: Sep. 16, 2003
Appl. No.: 09/677,129
Filed: Sep. 29, 2000

( * ) Notice: This patent is subject to a terminal disclaimer.

Related U.S. Application Data

(63) Continuation of application No. 08/864,700, filed on May 28, 1997, now abandoned, which is a continuation-in-part of application No. 09/107,031, filed on Jun. 29, 1998, now Pat. No. 6,149,522, which is a continuation-in-part of application No. 08/981,882, filed as application No. PCT/US96/10463 on Jun. 17, 1996, now Pat. No. 6,106,396, which is a continuation-in-part of application No. 08/497,662, filed on Jun. 29, 1995, now Pat. No. 5,643,086.

(51) Int. Cl.
*A63F 13/12* (2006.01)
*A63F 13/08* (2006.01)
*G06F 21/00* (2006.01)
*G06Q 50/00* (2006.01)
*G07F 17/32* (2006.01)

(52) U.S. Cl. ............................................. 463/37; 463/20
(58) Field of Classification Search ....................... None
See application file for complete search history.

(56) References Cited

U.S. PATENT DOCUMENTS 4,652,998 A   3/1987   Koza et al.
5,224,706 A   7/1993   Bridgeman et al.

FOREIGN PATENT DOCUMENTS

GB   2121569   7/1986

OTHER PUBLICATIONS

Gasser, Morrie; Le Roux, Yves; Lipner, Steve, The Digital Distributed System Security Architecture, Securicom 90, Mar. 14–16, 1990, 8th Worldwide Congress on Computer and Communications Security and Protection.

*Primary Examiner*—Peter C. English (57) ABSTRACT

Improved electronic gaming apparatus, including a cabinet for housing video and sound generating electronics, coin-handling and pay-out mechanism and a video display screen. The display screen is substantially taller than it is wide and preferably has a touch screen associated therewith. Although the displayed video presentation may take any form, the preferred slot machine display embodiment includes graphics replicating the standard play board at top, game board in middle, and principal user input interface below.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *